June 6, 1967  H. R. BEEN  3,323,875
MANUFACTURE OF CARNALLITE LIQUORS AND POTASSIUM CHLORIDE
Filed Sept. 25, 1964
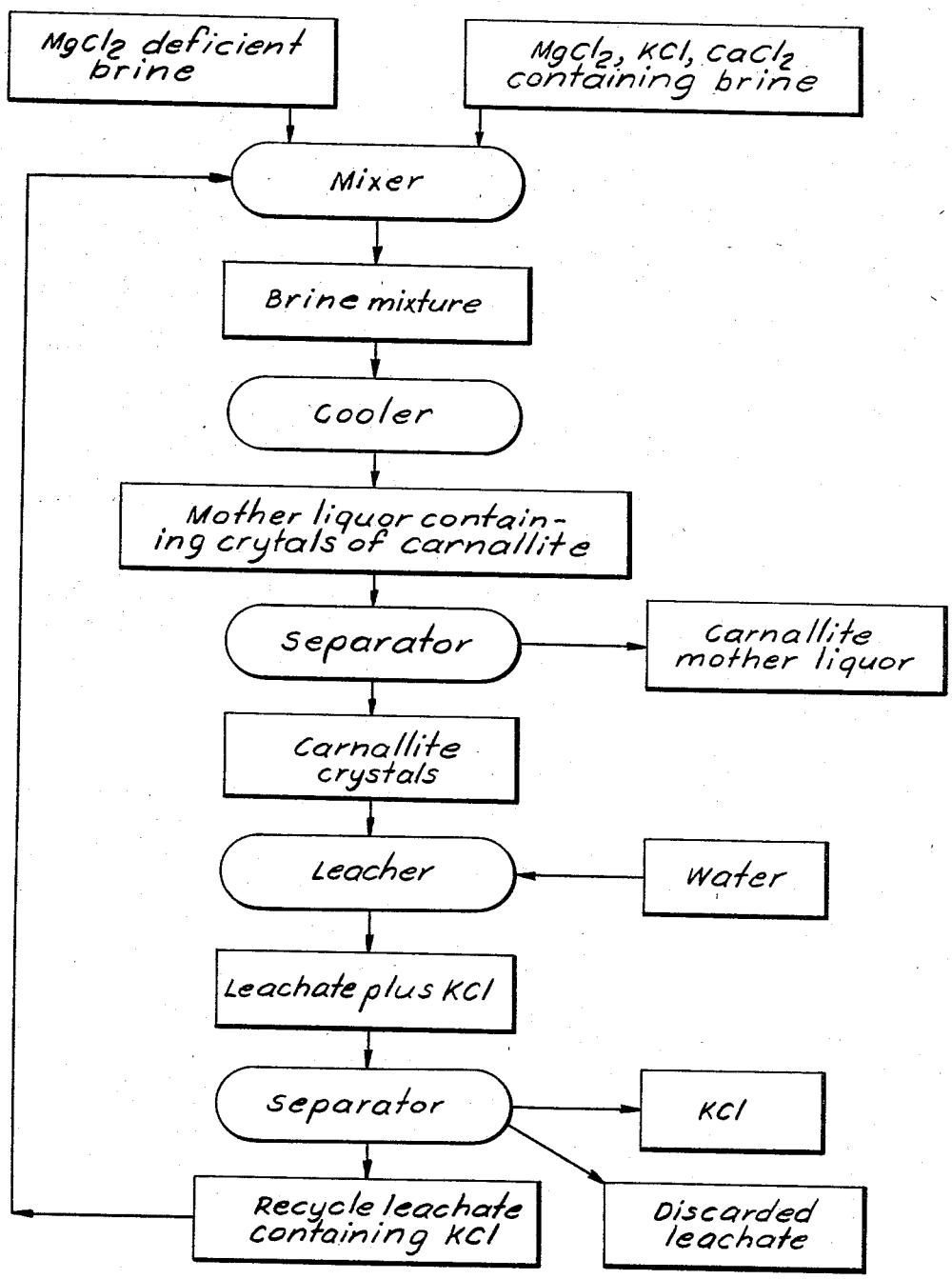
INVENTOR.
Hollis R. Been
BY Burton Rodney
ATTORNEY

United States Patent Office 3,323,875
Patented June 6, 1967

3,323,875
MANUFACTURE OF CARNALLITE LIQUORS AND POTASSIUM CHLORIDE
Hollis R. Been, Midland, Mich., assignor to The Dow Chemical Company, Midland, Mich., a corporation of Delaware
Filed Sept. 25, 1964, Ser. No. 399,179
2 Claims. (Cl. 23—299)

This invention relates to an improvement in the manufacture of carnallite liquors and potassium chloride and, more particularly is concerned with an improvement in a method for making carnallite mother liquors and potassium chloride crystals, said improvement resulting in an overall increase in chemical efficiency over present methods.

The term "carnallite mother liquors" as used herein means an aqueous mixture containing from about 5 to about 6 percent by weight $MgCl_2$, from about 0.7 to about 0.9 percent by weight KCl, from about 0.3 to about 0.4 percent by weight NaCl and from about 41 to about 44 percent by weight $CaCl_2$ with the remainder being water.

Until now, carnallite mother liquors have been prepared by cooling aqueous solutions containing well defined quantities of magnesium chloride, potassium chloride and calcium chloride to precipitate carnallite crystals. The carnallite mother liquor is then separated from the carnallite crystals. This mother liquor finds particular use in the manufacture of calcium chloride flakes wherein said liquor is limed to convert the magnesium chloride to magnesium hydroxide precipitate. The precipitate is separated from the remaining solution which consists essentially of calcium chloride, potassium chloride and sodium chloride. The solution is then partially evaporated to produce about a 70 percent by weight $CaCl_2$ solution, then flaked, and dried to about a 78 percent by weight $CaCl_2$ flake. The carnallite crystals are used primarily as a source of potassium chloride.

Heretofore large amounts of potassium chloride present in carnallite feed solutions were leached from the impure carnallite product during processing and were lost. The instant invention markedly reduces the amount of this loss thereby resulting in the saving of potassium chloride. Additionally reduced amounts of water evaporation and solution concentration also result thereby reducing steam power requirements. It also provides an overall increase in chemical efficiency over the existing process.

It is a principal object of the instant invention to provide an improvement in the method for producing carnallite mother liquor and potassium chloride crystals which results in an overall increase in chemical efficiency.

An additional object is to provide an improvement in the method for producing carnallite mother liquor and crystals of potassium chloride which results in the useful recovery of substantially all the potassium chloride present in the feed brine.

Further, it is an object to provide an improvement in the method for producing carnallite mother liquor and potassium chloride crystals which results in a method more easily controllable over wider operating ranges than methods heretofore.

Other objects and advantages of the instant invention will become apparent from reading the detailed description set forth hereinafter in conjunction wtih the accompanying figure which shows a schematic flow diagram of the instant invention.

In the existing method for preparing carnallite mother liquor and crystallizing potassium chloride, an aqueous brine containing at least magnesium chloride, potassium chloride, and calcium chloride is cooled to and maintained at temperatures of from about 28° C. to 32° C. for an extended period of time to precipitate out the solution carnallite crystals (i.e. $MgCl_2 \cdot KCl \cdot 6H_2O$). The carnallite crystals are separated from the residual carnallite mother liquor. The carnallite crystals are then leached with water thereby producing crystals of potassium chloride. A portion of the leachate (i.e. less than about 50 percent of the leachate) is then recycled as part of the feed solution for subsequent operations to provide a total feed solution containing a weight ratio of $MgCl_2/KCl$ of from about 20 to about 2.35. This known process results in recoveries, at a maximum of only about 60 percent of the KCl present in the brine feed.

Now, unexpectedly I have discovered that the efficiency of this process for making carnallite mother liquor and potassium chloride is greatly increased by recycling from about 85 to about 95 percent of the carnallite leachate as part of the feed and adding a magnesium deficient brine which contains at least potassium chloride and calcium chloride to the feed to provide a total brine feed containing a weight ratio of $MgCl_2/KCl$ of from about 2.0 to about 2.35. By this novel improvement substantially all of the KCl present in the feed is recovered as product.

The term "magnesium deficient brine" as used herein means an aqueous salt solution which contains at least potassium chloride and calcium chloride and which has substantially no magnesium salts therein.

The present invention for making carnallite mother liquor and crystals of potassium chloride can be further illustrated utilizing a concentrated natural brine containing at least from about 5.0 to about 6.0 percent by weight magnesium chloride, from about 2.0 to about 3.0 percent by weight potassium chloride, and from about 32.0 to about 36.0 percent by weight calcium chloride. The brine was maintained at a temperature within the range of from about 28° C. to about 32° C. for a period of from about 18 to about 22 hours so as to precipitate out of solution carnallite crystals, said crystals containing a weight ratio of $MgCl_2/KCl$ in a range of from about 1.25 to about 1.35. The carnallite crystals were then separated from the residual mother liquor for example as by filtration, and the said mother liquor recovered. The carnallite crystals were then leached with water at a temperature of from about 28° C. to about 32° C., thereby producing crystals of potassium chloride.

In accordance with the improvement of the instant invention, from about 85 to about 95 percent of the carnallite leachate was recycled as part of the feed solution so that that part of the leachate recycled was equal to from about 16 to about 24 percent by weight of the total fed solution. At the same time there was added to the feed solution a magnesium deficient brine which contains at least from about 20 to about 24 percent by weight calcium chloride, and from about 1.2 to about 1.7 percent by weight potassium chloride. The amount of this magnesium deficient brine to be added in this specific embodiment was from about 15 to about 35 percent by weight of the total brine feed. This will vary with brines of different composition as is understood by one skilled in the art. In any event, the amount of recycled carnallite leachate and magnesium deficient brine to be added is such that the total brine feed contains a weight ratio of $MgCl_2/KCl$ of from about 2.0 to about 2.35.

By employing the present invention, substantially all the potassium chloride originally present in the aqueous feed mixture is utilized to produce carnallite liquors and substantially pure KCl thereby giving marked increases in operating efficiencies.

Where brines contain dilute amounts of the various salts used as stated hereinbefore said brine can be partially evaporated or otherwise concentrated to produce a brine containing the desired salt concentrations.

The following example is merely illustrative of the instant invention and in no way is meant to limit it thereto:

*Example*

To about 100 tons of an aqueous brine having the following composition:

| | Percent by weight (about) |
|---|---|
| $MgCl_2$ | 3.5 |
| KCl | 1.6 |
| $CaCl_2$ | 18.5 |
| NaCl | 5.2 |
| $SiCl_2$ | 0.45 |

With the remainder being water.

were added to about 20 tons of a magnesium deficient aqueous brine having the following composition:

| | Percent by weight (about) |
|---|---|
| KCl | 1.5 |
| $CaCl_2$ | 22.5 |
| NaCl | 5.2 |

With the remainder being water.

The mixture was evaporated at a temperature of about 90° C. under a vacuum for a period of about one hour to remove about 45 tons of water. About 10 tons of previously recovered leachate having the following composition:

| | Percent by weight (about) |
|---|---|
| KCl | 5.0 |
| $MgCl_2$ | 16.0 |
| $CaCl_2$ | 10.0 |
| NaCl | 2.0 |
| $SiCl_2$ | 2.0 |

With the remainder being water.

were added to the above mixture to produce a total feed solution containing a weight ratio of $MgCl_2/KCl$ within the range of from about 2.0 to about 2.35. The total feed solution was then cooled to about 30° C. by water cooled heat exchangers for about 20 hours under atmospheric pressure thereby precipitating a carnallite $$(MgCl_2 \cdot KCl \cdot 6H_2O)$$

containing calcium chloride and sodium chloride from solution. The carnallite crystals were filtered from its mother liquor. The wet crystals weighing about 6.7 tons were analyzed and found to contain:

| | Percent by weight (about) |
|---|---|
| $MgCl_2$ | 27.0 |
| KCl | 21.0 |
| $CaCl_2$ | 9.0 |
| and NaCl as impurities | 2.4 |

The carnallite crystals thus contained a weight ratio of $MgCl_2/KCl$ of about 1.28.

The mother liquor weighted about 78.3 tons and was analyzed and found to contain:

| | Percent by weight (about) |
|---|---|
| $MgCl_2$ | 5 |
| KCl | 0.8 |
| $CaCl_2$ | 43 |
| and NaCl | 0.3 |

With the remainder being water.

The carnallite crystals were then leached with about 7.0 tons of water for about 4 hours thereby forming crystals of potassium chloride. The leachate was then filtered from the potassium chloride. About 90 weight percent (10 tons) of the leachate having a composition similar to that recycle leachate previously recovered and heretofore described was recycled back as part of the feed mixture. The final potassium chloride product was found to weight about 1.5 tons and contained:

| | Percent by weight (about) |
|---|---|
| KCl | 95.0 |
| and $MgCl_2$ | 0.6 |

With the remainder being small amounts of the sodium chloride, calcium chloride, other salts and water.

Thus, it is seen that carnallite mother liquor and relatively pure potassium chloride crystals were produced from a method using substantially all potassium chloride originally present in the aqueous feed mixture.

In a control run using the same procedure as described hereinbefore except that only about 50 percent of the leachate is recycled, only about 60 percent of the potassium chloride originally present in the feed is recovered.

Various modifications can be made in the improvement of the instant invention without departing from the spirit or scope thereof, for it is to be understood that I limit myself only as defined in the appended claims.

What is claimed is:

1. In a method for preparing carnallite mother liquor and potassium chloride crystals by providing an aqueous brine feed containing at least magnesium chloride, potassium chloride, and calcium chloride, cooling and maintaining said brine at a temperature of from about 28 to about 32° C. for an extended period of time so as to precipitate carnallite crystals out of solution, separating said crystals from the mother liquor, leaching said crystals with water to produce crystals of potassium chloride and a leachate rich in magnesium chloride, separating said potassium chloride crystals from the leachate, and recycling a portion of the leachate as part of the feed solution, the improvement which comprises:

(a) recycling from about 85 to about 95 percent of the magnesium chloride rich leachate as part of the feed solution, and
   (b) adding a magnesium deficient brine containing at least potassium chloride and calcium chloride to the feed so that the total feed brine contains a weight ratio of $MgCl_2/KCl$ of from about 2.0 to about 2.35.

2. In a method for preparing carnallite mother liquor and potassium chloride crystals by providing an aqueous brine feed solution containing at least from about 5.0 to about 6.0 percent by weight magnesium chloride, from about 2.0 to about 3.0 percent by weight potassium chloride, and from about 32.0 to about 36.0 percent by weight calcium chloride, cooling said solution to a temperature within the range of from about 28° C. to about 32° C., for a period of from about 18 to about 20 hours so as to precipitate out of solution carnallite crystals containing a weight ratio of $MgCl_2/KCl$ in a range of from about 1.25 to about 1.35, separating said carnallite from its mother liquor, recovering said mother liquor, leaching said carnallite crystals with water at a temperature within the range of from about 28° C. to about 32° C. to produce crystals of potassium chloride and a leachate rich in magnesium chloride, separating said potassium chloride crystals from the leachate, and recycling a portion of said leachate as part of the feed solution, said leachate containing at least from about 14.0 to about 18.0 percent by weight magnesium chloride, from about 4.0 to about 6.0 percent by weight potassium chloride and from about 8.0 to about 11.0 percent by weight calcium chloride, the improvement which comprises:

(a) recycling from about 85 to about 95 percent of the magnesium chloride rich leachate as part of the feed solution so that that part of the leachate recycled is equal to from about 16 to about 24 percent by weight of the total feed solution; and
   (b) adding a magnesium deficient brine to the feed solution, said magnesium deficient brine containing from about 32.0 to about 36.0 percent by weight calcium chloride, and from about 2.0 to about 3.0 percent by weight potassium chloride so that the magnesium deficient brine is from about 15 to about 35 weight percent of the total brine feed and so that the total brine feed contains a weight ratio of $MgCl_2/KCl$ of from about 2.0 to about 2.35.

References Cited

UNITED STATES PATENTS

| | | | |
|---|---|---|---|
| 1,215,546 | 2/1917 | Jones | 23—297 |
| 1,796,886 | 3/1931 | Collings | 23—304 |
| 2,479,001 | 8/1949 | Burke | 23—304 |

NORMAN YUDKOFF, *Primary Examiner.*

G. HINES, *Assistant Examiner.*